United States Patent [19]

Martin et al.

[11] Patent Number: 4,823,845
[45] Date of Patent: Apr. 25, 1989

[54] PIPE INSULATION

[75] Inventors: Phillip C. Martin, Conifer; Carl R. V. Linden, Littleton, both of Colo.

[73] Assignee: Manville Corporation, Denver, Colo.

[21] Appl. No.: 93,288

[22] Filed: Sep. 4, 1987

[51] Int. Cl.$^4$ ................................................. B32B 5/12
[52] U.S. Cl. ..................................... 138/149; 138/151; 156/215; 156/218; 156/165; 428/34.5
[58] Field of Search ........ 156/215, 213, 218, 190–192, 156/195, 184, 160, 165; 138/147, 149–151; 428/435, 36

[56] References Cited

U.S. PATENT DOCUMENTS

| | | | |
|---|---|---|---|
| 2,790,464 | 4/1957 | Stephens et al. | 138/157 |
| 2,906,317 | 9/1959 | Keyes | 156/218 X |
| 2,949,953 | 8/1960 | Di Maio et al. | 156/218 X |
| 3,012,923 | 12/1961 | Slayter | 138/149 X |
| 3,518,157 | 6/1970 | Terry et al. | 264/119 X |
| 3,620,258 | 11/1971 | Graham | 138/149 X |
| 4,025,680 | 5/1977 | Botsolas | 138/149 X |
| 4,128,678 | 12/1978 | Metcalfe et al. | 156/207 |

Primary Examiner—David Simmons
Attorney, Agent, or Firm—John D. Lister; Cornelius P. Quinn; Fred A. Winans

[57] ABSTRACT

Inorganic fibrous pipe insulation in the shape of a tube comprising outer and inner flexible sheets on the outer and inner cylindrical surfaces of the tube. A majority of the fibers are at right angles to the flexible sheets and therefore extend radially of the pipe to offer good compression resistance to impact. By using substantially non-stretchable material for the inner sheet a fibrous layer whose fibers are generally perpendicular to the layer can be permanently formed into generally cylindrical shape. For insulation designed to cover very small diameter pipes the thickness of the fibrous layer is varied to provide fewer adjacent the inner flexible sheet than are adjacent the outer flexible sheet.

6 Claims, 2 Drawing Sheets

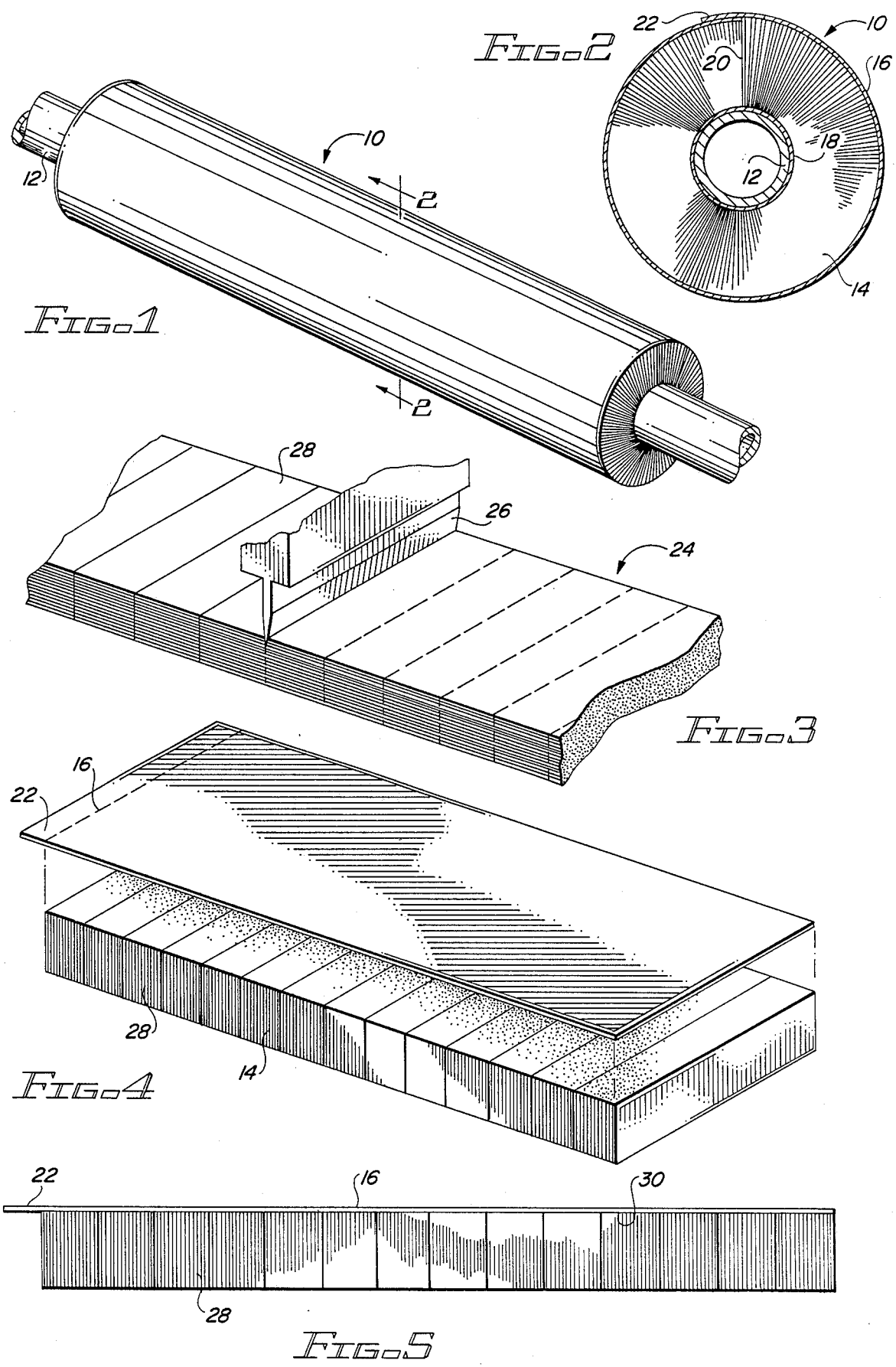

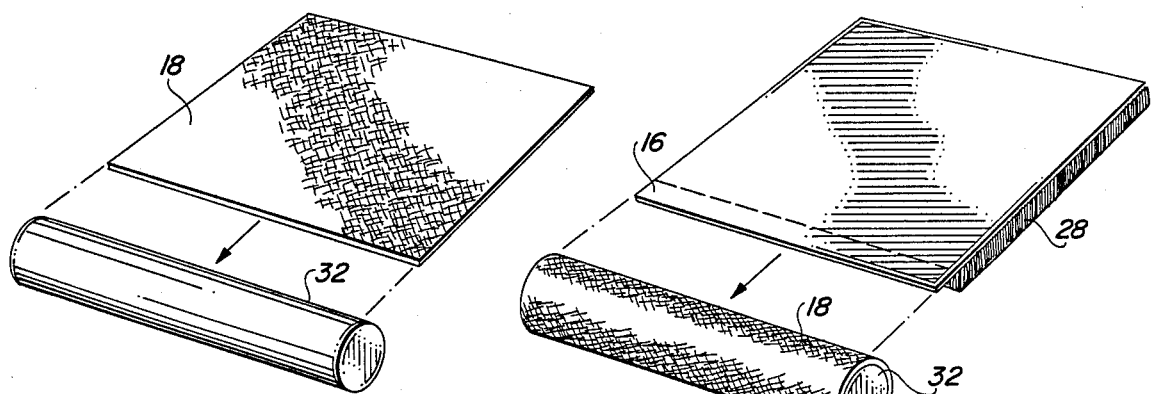
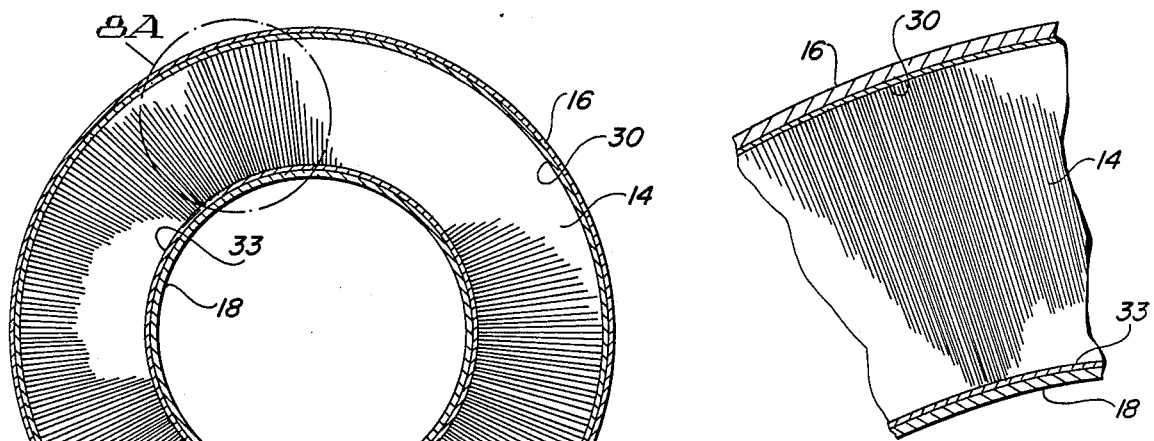
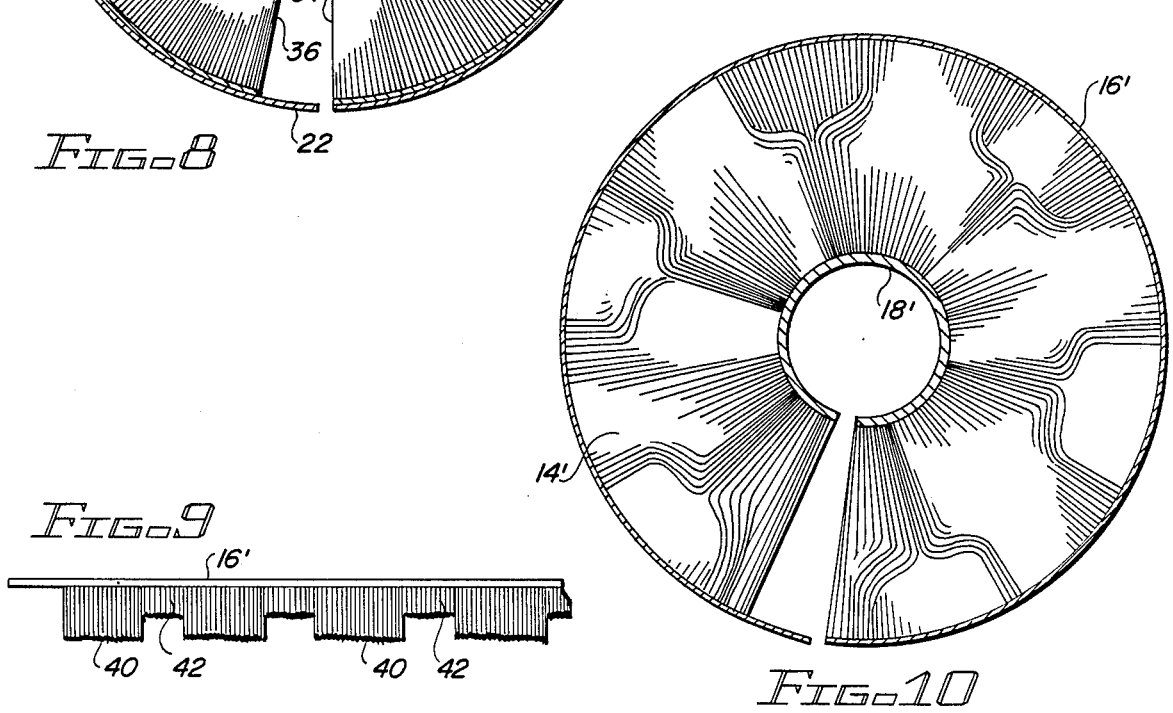

PIPE INSULATION

FIELD OF THE INVENTION

This invention relates to pipe insulation. More particularly, it relates to improved lightweight pipe insulation which has good compression resistance and which can readily be applied in the field.

BACKGROUND OF THE INVENTION

Pipes which conduct hot or cold fluids are commonly insulated by a variety of different types of insulation materials. The particular materials used depend in part on the requirements of the environment of the pipes. For example, insulation used to cover pipes on ships ideally would be lightweight, in order not to contribute to the weight of the vessel, and would be durable so as to resist the compressive force of impacts which inevitably occur in crowded conditions. Further, the insulation should be easy to install, in order to keep the installation cost low, and should be resistant to fire.

One common insulation used on ships is PVC-nitrile foam which, although an effective thermal and acoustical insulation, tends to sustain combustion with the generation of large amounts of thick smoke and toxic combustion products. A replacement product should have low flame spread characteristics which reduce or prevent the migration of a fire from its initial point of combustion to other locations. Preferably, it should further have low fuel contribution to reduce smoke generation.

One type is insulation material which has demonstrated good insulating performance in low densities in other types of environments is fiber glass insulation. It is normally not resistant to compressive forces, however, particularly in the low densities used in making a lightweight insulation material. A special configuration of fiber glass insulation comprising fibers which are generally oriented perpendicular to an outer jacketing material and to the surface being insulated has been found to provide greater resistance to compressive forces, but due to its nature this product is used only in insulating large diameter pipes and tanks. The minimum diamater of such pipes and tanks is much larger than the pipes found in environments such as on shipboard. In addition, these insulation products use binders which result in undesirably high water absorption and fuel content.

It would be desirable to produce an improved pipe insulation product which overcomes the drawbacks of the types of pipe insulation described above and which is also economical and simple to manufacture.

BRIEF SUMMARY OF THE INVENTION

The invention provides a generally cylindrical split tube of bonded inorganic fibers, preferably glass fibers, in which a majority of the fibers are oriented substantially radially of the pipe on which the insulation is installed. A flexible substantially non-stretchable sheet is adhered to the inner cylindrical surface of the insulation tube and corresponds in dimension to the outer circumference of the pipe. A flexible sheet is also adhered to the outer cylindrical surface of the insulation tube. A majority of the fibers in the tube are thus oriented at substantially right angles to the flexible sheets. This arrangement of fibers enables the insulation to resist severe compressive forces and allows the split tube of insulation to be flexed open enough to fit over the pipe being insulated.

The materials making up the components of the pipe insulation and the type and amounts of binders and adhesives provide a low fuel content anti-sweat pipe insulation system that meets the goals stated above. Further, the method of fabricating the pipe insulation is simple and inexpensive.

Other features and aspects of the invention, as well as its various benefits, will be made clear in the more detailed description of the invention which follows.

BRIEF DESCRIPTION OF THE DRAWINGS

FIG. 1 is a pictorial view of a section of pipe insulation shown mounted on a length of pipe;

FIG. 2 is a transverse sectional view of the installed pipe insulation taken on line 2—2 of FIG. 1;

FIG. 3 is a partial pictorial view of a layer of fiber glass insulation, shown in the process of being severed during the first stage of the fabricating process;

FIG. 4 is a pictorial representation of the next step in the fabrication process wherein a flexible sheet is applied to the outer face of the pipe insulation;

FIG. 5 is a partial side view of the insulation laminate resulting from the step shown in FIG. 4;

FIG. 6 is a pictorial view of the next step in the fabrication process showing a flexible sheet being applied to a mandrel;

FIG. 7 is a pictorial view of the next step in the fabrication process showing the laminate of FIG. 5 being adhered to the flexible sheet on the mandrel;

FIG. 8 is a transverse sectional view of the pipe insulation of the present invention after it has been removed from the mandrel;

FIG. 8A is an enlarged view of the circled portion of the pipe insulation of FIG. 8, showing the various layers more clearly;

FIG. 9 is a partial side view similar to that of FIG. 5, but showing a modified arrangement of the fibrous insulation; and FIG. 10 is a transverse sectional view similar to that of FIG. 8, but showing pipe insulation formed from the fibrous insulation of FIG. 9.

DESCRIPTION OF THE INVENTION

Referring to FIGS. 1 and 2, a section of pipe insulation 10 of the present invention is shown mounted on metal pipe 12. The insulation is tubular in shape and the inside cylindrical surface of the tube can be seen to snugly fit against the outside surface of the pipe 12. The insulation material is comprised of bonded inorganic fibers 14, preferably glass fibers, wherein a majority of the fibers are oriented generally radially of the pipe. Thus when the pipe insulation is subjected to severe compressive forces, such as when an object strikes it or a person stands on it, the fibers, being oriented so as to receive the impact on end rather than on their sides, will bend but quickly return to their original condition when the load is removed. The insulation itself during this process will be observed to compress but to quickly return to its uncompressed state when the load is removed.

An outer flexible sheet or jacket 16 is adhered to the outer cylindrical surface of the tube and an inner flexible sheet 18 is adhered to the inner cylindrical surface of the tube. The tube of insulation will have been provided in the form of a split cylindrical tube having adjacent edges separated to form the split. After being installed the eges abut one another so that the installed insulation tube performs as an integral closed tube. The juncture of the abutting edges is represented in FIG. 2 at 20. Immediately radially outwardly of the juncture is an extension of the outer sheet or jacket 16 which forms a tab or overlap 22, the purpose of which is to cover the joint or juncture of the edges so as to completely cover the fibrous insulation. In practice, the tab would be taped down after the insulation section has been installed.

The fibrous insulation is of the type formed by the usual fiber glass manufacturing process wherein the fibers are collected in blanket form and generally extend in the direction of the length of the blanket. The length of such fibers is generally in the range of 0.5 to 2 inches and the diameter of the fibers is generally in the range of 3 to 8 microns. The density of such fibrous material is generally in the range of 2.5 to 3 pcf, and most commonly is about 2.8 pcf. A layer of fiber glass insulation of this type is shown in FIG. 3 at 24. A cutter 26 is shown in the process of slitting the layer of insulation 24 into strips 28. Although a reciprocating blade has been shown as the cutter for purpose of illustration, obviously other suitable cutting devices such as rotary cutters can be used instead.

As shown in FIG. 4, the next step in the fabrication of the insulation of the present invention is to adhere the outer sheet or jacket material 16 to the strips of insulation 28. In this operation the strips will be positioned in adjacent side by side contact so that the width of the strips are originally cut from the sheet 24 is now the height. A majority of the individual fibers 14 are therefore vertically arranged and are perpendicular to the sheet material 16. The sheet 16 is then adhered to the upper faces of the strips to form the intermediate laminate shown in FIG. 5 comprising the sheet 16 adhered to the strips by a layer of adhesive 30. The strips are thus held in place to form a continuous layer of fibrous insulation in which the majority of fibers extend generally perpendicular to the sheet 16. The tab 22 extends beyond the end of the insulation as explained above. If desired the strips can be moved onto the stationary sheet instead of moving the sheet onto the strips, although it is preferred to move the sheet against stationary strips in order to better hold the strips in contiguous relationship during the laminating process.

Referring to FIG. 6, in a separate step from the laminating step described above, the inner sheet 18 is wrapped around a mandrel 32 which is of the same outer diameter as the pipe on which the insulation is designed to be installed. the inner sheet 18, which is flexible but substantially non-stretchable, fits about the mandrel so that its free ends abut but are unattached to each other. The length of the sheet 18 is therefore equal to the circumference of the mandrel and thus also to the circumference of the pipe on which the insulation will be installed. The sheet can be retained in place on the mandrel by any suitable means which will permit the sheet to be subsequently removed, such as by a mechanical clamping device, not shown, adpated to be closed to hold the sheet in place and opened to release it. Such devices are readily available to one or ordinary mechanical skill.

Referring to FIG. 7, after the sheet 18 has been set in place on the mandrel 32, the laminate of the outer sheet 16 and the layer of insulation strips 28 is wrapped around the covered mandrel and adhered to the inner sheet 18 by suitable adhesive. The resulting product, after it has been removed from the mandrel, is shown in FIG. 8 to correspond to the insulation of FIG. 2 prior to installation on a pipe, with the sheet 16 adhered to the outer circumference of the fiber glass tube by a layer of adhesive 30, and the sheet 18 adhered to the inner circumference of the fiber glass tube by a layer of adhesive 33. The adhesive layers and the other components of the insulation product are shown in more detail in the enlarged view of FIG. 8A.

The majority of the fibers 14 extend generally perpendicular to the inner and outer sheets 18 and 16, but due to the shorter radius of curvature of the inner surface of the tube the fibers 14 are squeezed more closely together adjacent the inner sheet 18 than they are adjacent the outer sheet 16. Because the inner sheet 18 is substantially shorter than the outer sheet 16, and because it is substantially non-stretchable, the insulation is held thereby in a generally cylindrical shape, the adjacent edges 34 and 36 of the insulation layer being spaced a short distance from each other. The resilient nature of the product permits the tube to be spread apart to widen the gap between the eges 34 and 36 in order to place the tube over a pipe. The edges are then brought together and the tab 22 is taped or otherwise adhered in place, resulting in a smooth length of insulation completely covering the pipe inside.

As previously mentioned, it is desirable that the insulation product have as low a fuel content as possible in order to prevent or resist fire. In order to make the product economically viable, however, it is not practical to use inorganic binder material. For this reason it is preferred that organic binder used to bond the fibers together in blanket form during the fiber blanket manufacturing process be present in minimal amounts, but in sufficient quantities to provide the necessary structural cohesiveness to enable the manufacturing process and the necessary handling to take place. Preferably, in order to avoid unacceptable contribution to combustion and flame spread the organic binder content of the fibrous insulation should be in the approximate range of 5% to 9% by weight of the bonded fibrous insulation. As an example, a fiber glass layer comprising 5% by weight of phenolic resin binder was found to have sufficient structural integrity. If preferred, binder blends can be used in order to impart certain desired properties. For example, silicone binder can be present in minor amounts, such as 1% by weight of the fiber glass insulation, to take advantage of its nonwetting characteristics.

The outer sheet or jacket 16 should also preferably have a low fuel content and function as a vapor barrier as well. In addition, the adhesive layer 30 used to bond the sheet 16 to the insulation must have adequate bonding strength and also preferably should not contribute to combustion or flame spread. An example of the sheet 16 is a polymide film sold by E.I. DuPont De Nemours and Company under the trademark Kapton. The thickness of the film can vary but preferably is in the range of 1 to 4 mils. If desired, in order to make the insulation more durable and resistant to wear, sheet 16 can comprise a laminate of materials selected for their particular attributes. For example, the polyimide film may be laminated to a tough glass cloth of the type known as marine cloth, to take advantage of the wearing characteristics of the marine cloth. Even though the sheet 16 comprises a laminate, the fabrication of the pipe insulation would remain the same as described above in connection with the sheet 16.

The inner sheet 18, as noted above, must be substantially non-stretchable in order for the radially directed fiber arrangement to be feasible and in order for the snap-fit of the product to work. As in the case of the outer sheet, the inner sheet should have a low fuel content and the adhesive bond 33 between the inner sheet and the fibrous layer must be strong enough to remain intact when subjected to application and service stresses. A conventional fiber glass scrim sheet has been found to function well as the inner sheet. Such scrim sheets ar flexible, lightweight, tolerant to the adhesive, and contain sizing sufficient to prevent unraveling of the fiber glass strands in the scrim.

The thickness of the insulation product of this invention is quite substantial compared to the diameter of the pipe being covered. When the pipe is of very small diameter, however, up to about two inches, the required thickness of insulation makes the formation of a tubular shape difficult to achieve. This is due to the fact that the fibers adjacent the inner sheet compress together when the fibrous layer is formed into a cylinder about the mandrel. When forming a cylinder of insulation having an inner circumference corresponding to the circumference of a very small diameter pipe, there is simply not enough room for the fibers adjacent the inner sheet, even when they are compressed during the formation of the insulation tube.

In order to form insulation of ths size a laminate of the type shown in FIG. 9 can be used. this comprises an outer sheet 16', similar to the sheet 16 of the FIG. 5 arrangement, and alternately arranged fibrous strips 40 and 42. The strips 40 are similar in size and shape to the strips 28 shown in FIG. 4, which establishes the thickness of the insulation layer. The strips 42, however, are not as thick as the strips 40 so that when the laminate is wound onto a mandrel to adhere the inner sheet to the insulation layer and to establish the cylindrical shape of the product, the fibers of the strips 42 will not extend all the way to the inner sheet. Thus because there is less fibrous material adjacent the inner sheet in this embodiment there is room for the fibers to be compressed together even within the tight confines created by the very small radius of curvature of the inner cylindrical surface of the insulation tube. Preferably, to aid in the formation of such a product, the strips 42 are narrower than the strips 40, but it should be understood that the relative widths of the strips depend on the diameter of the pipe to be covered.

The insulation product resulting from the laminate of FIG. 9 is illustrated in FIG. 10 and can be seen to comprise outer and inner sheets 16' and 18' establishing the boundaries of a tube of insulation as in the FIG. 8 arrangement. As in the FIG. 8 arrangement the majority of the fibers 14' are at substantially right angles to the sheets. Although there are fewer fibers adjacent the fibrous face of the laminate of FIG. 9 than there are adjacent the fibrous face of the laminate of FIG. 5, after the mandrel forming operation the amount of fibrous material adhered to the inner sheet 18' is generally the same as the amount of fibrous material adhered to the inner sheet 18 of the FIG. 8 arrangement. The types of adhesives and inner and outer facing sheets are similar to those of the first embodiment and need not be changed due to the small size of the insulation tube.

It should now be clear that the present invention provides a unique pipe insulation arrangement which satisfies the physical requirements outlined above for a lightweight product which must be capable of withstanding high impact abuse. Further, the preferred materials of construction enable the product to resist combustion and flame spread, which can be a vital consideration in any environment where fire could be especially calamitous, and especially on shipboard.

It should be obvious that although preferred embodiments of the invention have been described, changes to certain details of the embodiments can be made without departing from the spirit and scope of the invention.

What is claimed is:

1. Insulation for covering a length of pipe of predetermined diameter, comprising:
   a generally cylindrical split tube comprised of bonded glass fibers, the split tube having an an inner cylindrical surface, adapted to surround the pipe, and an outer cylindrical surface;
   the tube further having spaced opposed edges extending generally lengthwise of the tube and forming the split in the tube;
   a flexible substantially non-stretchable sheet adhered to the inner cylindrical surface of the split tube, the circumference of the inner cylindrical surface of the split tube corresponding in dimension to the circumference of the pipe to be covered;
   a majority of the glass fibers being oriented substantially at right angles to the flexible sheet so as to be oriented substantially radially of the pipe on which the insulation is installed; and
   a flexible sheet adhered to the outer surface of the split tube;
   a significant number of the fibers extending from the flexible sheet extend a greater distance than other fibers wherein the number of fibers adjacent the outer flexible sheet is significantly greater than the number of fibers adjacent the inner flexible sheet; the fibers adjacent the outer flexible sheet being oriented substantially radially of the outer flexible sheet;
   the split tube of insulation being adapted to the spread apart at the split portion thereof to form a gap wide enough to allow the split tube to be installed on a length of pipe, the split tube being sufficiently resilient to cause the spaced opposed edges to snap back toward each other after being installed so that the distance therebetween becomes less than the width of the gap.

2. Insulation for covering a length of pipe according to claim 1, wherein the flexible substantially non-stretchable sheet adhered to the inner cylindrical surface of the split tube comprises a fiber glass scrim sheet adhesively bonded to the inner cylindrical surface.

3. Insulation for covering a length of pipe according to claim 1, wherein the flexible sheet adhered to the outer cylindrical surface of the split tube comprises a laminate of polyimide film and fiber glass cloth adhesively bonded to the outer cylindrical surface.

4. A method of fabricating tubular fibrous insulation for covering a pipe of predetermined diameter, comprising the steps of:
   providing a compressible blanket comprised of bonded glass fibers wherein a majority of the fibers are oriented substantially along the length of the blanket;
   cutting the blanket at substantially right angles to the orientation of the majority of the fibers to produce relatively narrow strips of blanket;
   adhereing the strips to a flexible sheet comprising a laminate of polyimide film and glass cloth so that a majority of the fibers in the strips are oriented at substantially right angles to the flexible sheet, the strips being contiguous to each other to form a continuous fibrous layer; and adhering the exposed face of the continuous fibrous layer to a flexible substantially non-stretchable sheet having a length shorter than the length of the first sheet, the length of the second sheet corresponding to the length of the continuous fibrous layer and being substantially equal to the circumference of the pipe to be covered by the insulation whereby the difference in length between the first sheet and the second sheet and the compressibility of the fibrous layer in a direction transversely of the orientation of the majority of fibers causes the insulation to conform to the general shape of a tube.

5. A method of fabricating tubular fibrous insulation according to claim 4, wherein the second sheet is wrapped around a mandrel prior to being contacted by the fibrous layer, and the fibrous layer is adhered to the second sheet by wrapping the fibrous layer around the sheet-covered mandrel.

6. Insulation for covering a length of pipe of predetermined diameter, comprising:

a generally cylindrical split tube comprised of bonded inorganic fibers, the split tube having an inner cylindrical surface, adapted to surround the pipe, and an outer cylindrical surface;

the tube further having spaced opposed edges extending generally lengthwise of the tube and forming the split in the tube;

a flexible substantially non-stretchable sheet adhered to the inner cylindrical surface of the split tube, the circumference of the inner cylindrical surface of the split tube corresponding in dimension to the circumference of the pipe to be covered;

a majority of the inorganic fibers being oriented substantially at right angles to the flexible sheet so as to be oriented substantially radially of the pipe on which the insulation is installed; and a flexible sheet adhered to the outer surface of the split tube;

the split tube of insulation being adapted to be spread apart at the split portion thereof to form a gap wide enough to allow the split tube to be installed on a length of pipe, the split tube being sufficiently resilient to cause the spaced opposed edges to snap back toward each other after being installed so that the distance therebetween becomes less than the width of the gap;

some of the fibers extending from the flexible sheet a greater distance than other fibers, whereby the continuous fibrous layer is of varying thickness, causing the number or fibers adjacent the outer flexible sheet to be significantly greater than the number of fibers adjacent the inner flexible sheet, the fibers adjacent the outer flexible sheet being oriented substantially radially of the outer flexible sheet.

* * * * *